(12) United States Patent
Bohlien

(10) Patent No.: US 10,209,153 B2
(45) Date of Patent: Feb. 19, 2019

(54) PRESSURE INDICATING DEVICE

(71) Applicant: SAMSON AG, Frankurt am Main (DE)

(72) Inventor: Werner Bohlien, Obertshausen (DE)

(73) Assignee: Samson AG (DE)

( * ) Notice: Subject to any disclaimer, the term of this patent is extended or adjusted under 35 U.S.C. 154(b) by 0 days.

(21) Appl. No.: 14/952,010

(22) Filed: Nov. 25, 2015

(65) Prior Publication Data
US 2016/0153854 A1   Jun. 2, 2016

(30) Foreign Application Priority Data

Nov. 28, 2014   (DE) .................. 10 2014 017 548

(51) Int. Cl.
| | |
|---|---|
| *F17D 3/00* | (2006.01) |
| *G01L 7/16* | (2006.01) |
| *F15B 11/024* | (2006.01) |
| *F16K 7/12* | (2006.01) |
| *F16K 37/00* | (2006.01) |

(52) U.S. Cl.
CPC .............. *G01L 7/16* (2013.01); *F15B 11/024* (2013.01); *F16K 7/12* (2013.01); *F16K 37/0066* (2013.01); *G01L 7/163* (2013.01); *G01L 7/166* (2013.01)

(58) Field of Classification Search
CPC . G01L 7/166; G01L 7/163; G01L 7/16; F15B 11/024; F16K 37/0066
USPC ....................... 137/557; 73/44, 700, 714, 715
See application file for complete search history.

(56) References Cited

U.S. PATENT DOCUMENTS

| | | | | |
|---|---|---|---|---|
| 3,448,716 A | * | 6/1969 | Smith ................. | B01D 35/143 116/267 |
| 4,782,850 A | * | 11/1988 | Duffy ................. | G05D 16/0686 137/116.5 |
| 8,573,046 B1 | | 11/2013 | Ohm et al. | |

(Continued)

FOREIGN PATENT DOCUMENTS

| | | |
|---|---|---|
| DE | 35 32 755 | 3/1987 |
| DE | 88 01 016 U1 | 4/1988 |

(Continued)

OTHER PUBLICATIONS

European Search Report, application EP 15196657, search report dated Aug. 16, 2016, 4 pages.

(Continued)

*Primary Examiner* — Craig Schneider
*Assistant Examiner* — Angelisa L Hicks
(74) *Attorney, Agent, or Firm* — Ware, Fressola, Maguire & Barber LLP

(57) ABSTRACT

The invention relates to a pressure indicating device for indicating a pressure in a first fluid system, said pressure indicating device including a first port via which it is fluidically connected to the first system, which pressure indicating device furthermore comprises a cylinder with a preloaded piston that can be displaced therein in an axial direction, during which movement fluid contained in the first system can act on the piston surface. The invention is characterized in that said piston has an opening in its piston surface, which opening can be made to communicate with a second system via a second port, said piston comprising a diaphragm which is impermeable to a first fluid but permeable to a second fluid, said diaphragm separating the first port from the second port.

17 Claims, 2 Drawing Sheets

(56) References Cited

U.S. PATENT DOCUMENTS

| | | | |
|---|---|---|---|
| 2005/0072349 A1* | 4/2005 | Perlin | B60C 23/0408 |
| | | | 116/34 B |
| 2005/0254973 A1* | 11/2005 | Berger | F16K 7/14 |
| | | | 417/416 |
| 2006/0079862 A1* | 4/2006 | Genosar | A61M 5/1454 |
| | | | 604/890.1 |
| 2007/0068263 A1* | 3/2007 | Reinwald | G01L 27/005 |
| | | | 73/714 |
| 2011/0315904 A1 | 12/2011 | Karte | |
| 2013/0086988 A1* | 4/2013 | Evans | G01L 7/18 |
| | | | 73/702 |

FOREIGN PATENT DOCUMENTS

| | | |
|---|---|---|
| DE | 43 28 617 A1 | 3/1995 |
| DE | 10 2010 024 723 | 12/2011 |
| DE | 10 2010 045 564 A1 | 3/2012 |

OTHER PUBLICATIONS

European Search Report (partial), application EP 15196657.9, search report dated Apr. 21, 2016, 7 pages.

* cited by examiner

PRESSURE INDICATING DEVICE

CROSS-REFERENCE TO RELATED APPLICATIONS

This application claims priority to German Appl. No. 10 2014 017 548.0 filed Nov. 28, 2014, which is hereby incorporated by reference in its entirety.

TECHNICAL FIELD

The invention relates to a pressure indicating device for indicating a pressure in a first fluid system, the pressure indicating device including a first port via which it is fluidically connected to the first system, which pressure indicating device furthermore includes a cylinder in which a preloaded piston can be displaced in an axial direction, during which movement fluid contained in the first system can act on the piston surface, and for indicating a pressure above a certain threshold value.

BACKGROUND

A pressure indicating device is already known which indicates a pressure of a fluid contained in a first system which exceeds a certain threshold value. This prior art device comprises a single-acting cylinder which has connecting means for fluidically connecting the device to a first system. Disposed in the cylinder is a piston which is preloaded and can be moved in an axial direction within said cylinder, during which movement said fluid can act on the piston surface. The threshold value from which a pressure will be indicated can be set via the piston surface and the preload. If the piston is moved out of its inertial position, it can thus be determined that a pressure prevails in the device which exceeds the set threshold value.

A prior art pressure indicating device for indicating a pressure above a certain threshold value of a fluid contained in a first fluid system comprises a single-acting cylinder. The pressure indicating device has connecting means for fluidically connecting the device to a first system. Disposed in the cylinder is a piston which is preloaded and can be moved in an axial direction within said cylinder, during which movement said fluid can act on the piston surface. The threshold value from which a pressure will be indicated can be set through the size of the piston surface and the preload.

SUMMARY OF THE INVENTION

It is the object of the invention to provide media-selective pressure evaluation.

The object of the invention is accomplished by a pressure indicating device for indicating a pressure in a first fluid system, said pressure indicating device including a first port via which said pressure indicating device is fluidically connected to the first fluid system, a cylinder in which a preloaded piston can be displaced in an axial direction, during which movement fluid contained in the first fluid system can act on the piston surface, wherein said piston has an opening in its piston surface, which opening can be made to communicate with a second system via a second port, said piston comprising a diaphragm which is impermeable to a first fluid but permeable to a second fluid, said diaphragm separating the first port from the second port.

According to the invention, the piston has an opening in its piston surface which communicates with a second system. In addition, the piston comprises a diaphragm which is impermeable to a first fluid, in particular a liquid, but permeable to a second fluid, in particular a gas, said diaphragm separating said first system from said second system. The diaphragm fully covers the opening.

The diaphragm thus allows measurement of a liquid pressure prevailing in a first system, for example, while feeding gas to the system will not result in any pressure increase as such gas can be discharged into the second fluid system via the diaphragm. If the liquid pressure exceeds the set threshold value, this will be indicated by a displacement of the piston.

According to a first advantageous embodiment of the invention, the diaphragm is permeable to air, but impermeable to water or oil.

This allows the monitoring of all common process media. A diaphragm of this type is known under the "GoreTex" brand name, for example.

Examples of monitoring tasks may be liquid level monitoring or monitoring the tightness of a container. Where a first container is contained inside a second container, for example, with the space in between containers being filled with gas, the penetration of liquid into the space between the containers in case of a leakage of the inner container can thus be indicated.

In a first advantageous embodiment of the invention, the opening in the piston surface is connected to an axial duct in the piston rod.

The piston rod may be connected to a second system which is either independent of the first system or which communicates with the first system.

In an embodiment of the invention which is considered particularly advantageous, the second system may be the environment/ambient atmosphere. According to this embodiment, the piston rod may simply be formed as a hollow tube which is open to the ambient atmosphere. This constitutes a particularly simple form of a second connection.

Furthermore, the second system can be designed so as to communicate with the first system. This means that in the case of a closed gas volume in the first system, any gas exiting through the diaphragm may again be returned to the first system via a line.

In the case of double tanks, the pressure indicator may be mounted further down in the direction of the weight force than the line used to return the gas to the space between the containers. According to the invention, the line has been designed such that movement of the piston will still be possible, so as to allow an increase in pressure to be indicated by a displacement of the piston.

According to another advantageous embodiment of the invention, it may also be envisaged that the first system is a chamber between two diaphragms of a double diaphragm of a control valve diaphragm actuator. In such an embodiment, the second system may be formed by the ambient atmosphere. An actuator with two diaphragms has two redundant diaphragms. Rupture of one diaphragm will result in a pressure increase of the fluid, in particular liquid fluid, which had originally been separated by the intact diaphragm. This pressure increase of the liquid fluid will then be indicated by a displacement of the piston. However, minor gas pressure fluctuations in the intermediate space may be compensated by the diaphragm without being indicated at all.

Specifically, the preload is generated by a coil spring which acts on the piston ring surface and rests against the cylinder. This is a particularly simple and approved way of preloading a single-acting cylinder. Using the spring values, the threshold value to be indicated can thus be set in a simple way based on the piston surface.

In accordance with a particularly simple embodiment of the invention, the piston rod itself may serve as the indicating element so that, if the preloading element can be compressed, the piston rod will form a section which can be seen outside the cylinder. If such section is visible, then this can be seen as an indication that the pressure of the process medium has exceeded a set threshold.

According to another embodiment the indicating element may comprise a sensor, especially a magnetic, inductive or capacitive and/or a switch, especially a Reed-switch, so that the movement and/or change of position of the piston rod can be transformed into an electric signal. Furthermore the indicating element can comprise electrically controlled indicating means, e.g. an acoustical or an optical indicator, e.g. comprising a LED or display. Accordingly the electrically controlled indicating means indicate the position detected by the said sensor and/or switch. The position information can also be fed to a Control system e.g. via a bus system. Another advantageous embodiment of the invention is formed by providing catch means which will cooperate with the piston so as to lock the piston in its indicating position to ensure that the piston will also retain its indicating position in the event of a pressure decrease.

According to another aspect of the invention, a control valve comprising a diaphragm actuator is provided, which actuator has at least one actuating diaphragm that is connected to a valve rod. The actuating diaphragm in turn has an actuating chamber to which an actuating fluid can be applied, and a second chamber separated by the actuating diaphragm whose volume is fluidically connected to a pressure indicating device as described above.

In an advantageous further embodiment of the invention, the second chamber may be formed between a first actuator diaphragm and a second actuator diaphragm, and the volume of the second chamber is fluidically connected to a pressure indicating device according to one of the preceding embodiments. If the first actuator diaphragm ruptures, a defect can thus be indicated and operation of the control valve may still be safeguarded by means of the second actuator diaphragm.

As described above, the diaphragm may seal the cylinder volume from the environment/ambient atmosphere, thus allowing a gas pressure balance/air pressure balance to be performed in the chamber. Rupture of the diaphragm will result in an effective pressure increase caused by the liquid fluid entering the chamber. In this way, rupturing of the diaphragm can thus be reliably detected and any required repair measures can be carried out.

More specifically, the diaphragm actuator is of the hydraulic type. The hydraulic fluid may be water or oil.

Additional advantages, features and possible applications of the present invention may be gathered from the description in which reference is made to the embodiments illustrated in the drawings.

Throughout the description, claims and drawings, those terms and associated reference signs are used as are listed in the List of Reference Signs which follows below.

BRIEF DESCRIPTION OF THE DRAWINGS

The invention will now be explained with reference to the drawings, in which.

DETAILED DESCRIPTION OF THE INVENTION

Figure 1:
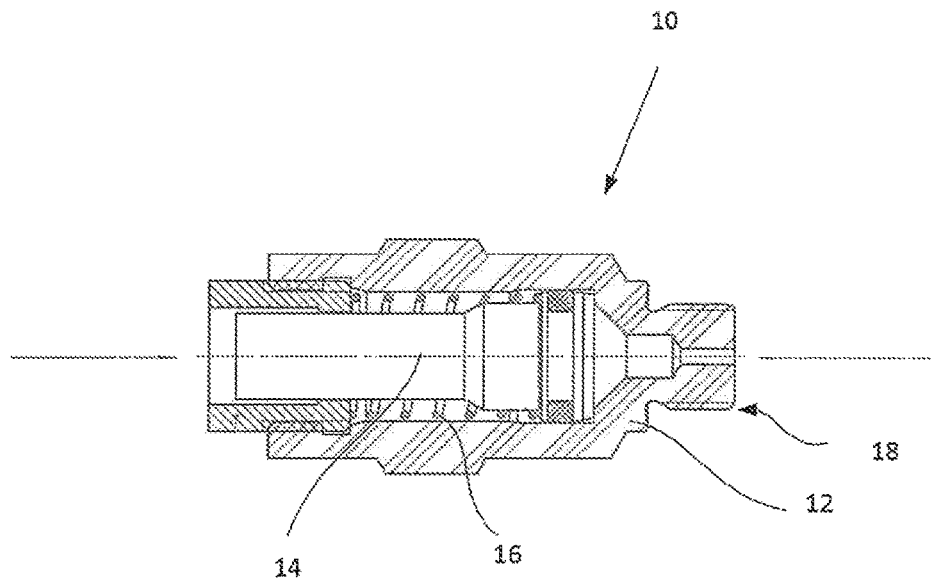
FIG. 1 is a view of a prior art pressure indicating device.

The view of FIG. 1 shows a pressure indicating device 10 of the prior art. This pressure indicating device 10 comprises a cylinder 12 and a piston 14 which is preloaded by a spring 16 and disposed in the cylinder 12 so as to be axially movable therein. By way of port 18, cylinder 12 can be fluidically connected to a first volume. The second end of cylinder 12 is connected to a second volume, the environment. In the preloaded position of piston 14, there may be fluid communication between the first and second volumes owing to leakage. When pressure rises fast in the first volume, this will cause piston 14 to be displaced against the action of the spring and made to protrude from cylinder 12, thus indicating a pressure that is higher than the threshold value set by means of spring 16. In its displaced state, piston 14 will seal the first volume from the environment.

Figure 2:
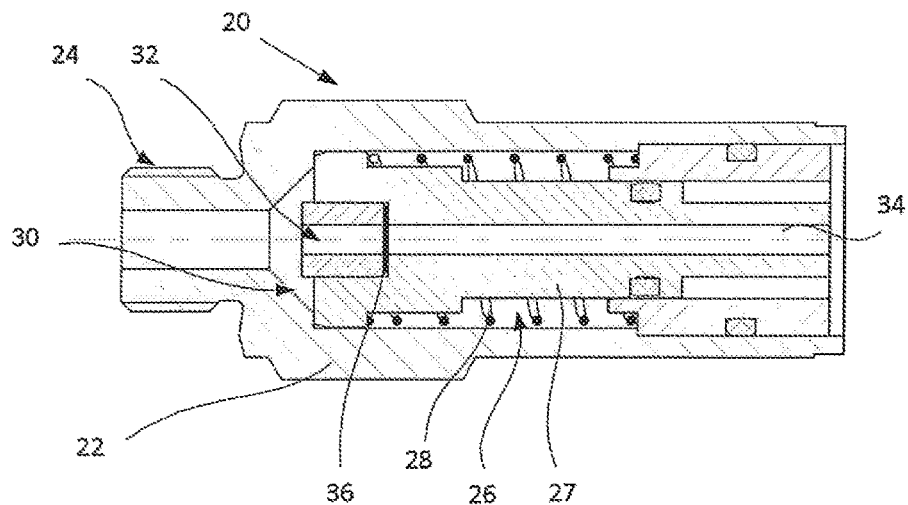
FIG. 2 is view of a pressure indicating device according to the present invention.

The view of FIG. 2 is a pressure indicating device 20 according to the invention. Pressure indicating device 20 comprises a cylinder 22 which includes a first port 24 for fluidically connecting it to a first volume. Furthermore, pressure indicating device 20 has a piston 26 which is supported so as to be axially movable against the action of a spring 28, in particular a coil spring. Spring 28 can be used to set the pressure required to displace the piston 26 by the first fluid acting on its piston surface 30. An opening 32 has been provided in the piston surface 30, said opening 32 connecting the interior of the cylinder, and thus a first volume, to a second volume, in particular ambient atmosphere, via a duct 34 (a second port) in piston rod 27. In the transition from the first volume to ambient atmosphere, piston 26 includes a diaphragm 36 which is impermeable to the first fluid, in particular a liquid, and permeable to a second fluid, air. In this way, the first fluid can build a pressure against the piston surface 30 within the cylinder, whereas the permeability of the diaphragm regarding the second fluid, air, will prevent a pressure build-up, in particular in case of minor pressure fluctuations. As is also known in the prior art, if the pressure value set via the spring 28 is exceeded, piston 26 will be pushed out of the cylinder housing to thus indicate that the current pressure value has exceeded a threshold value. This constitutes a simple manner of indicating pressure in a media selective way.

Figure 3:
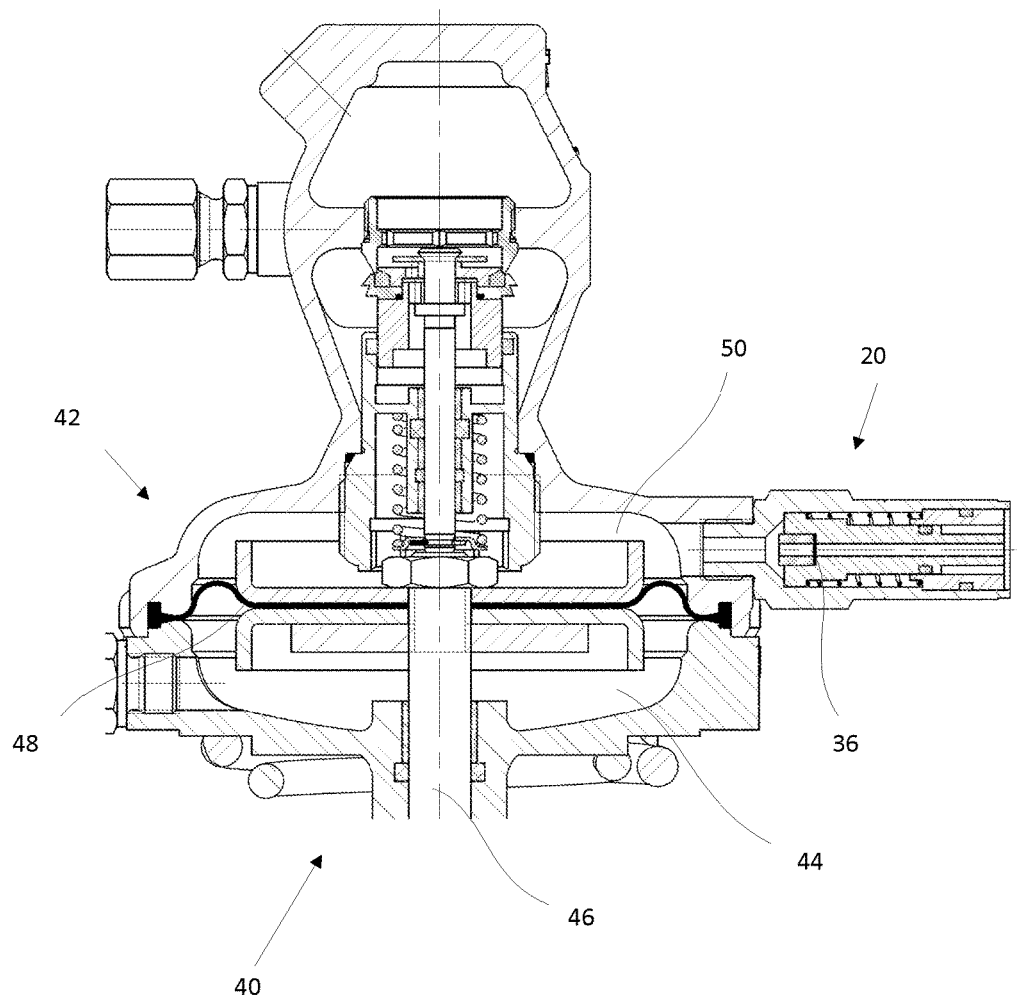
FIG. 3 is a view of a control valve for indicating diaphragm rupture.

FIG. 3 is a cutout view of a control valve 40 including a diaphragm actuator 42. Diaphragm actuator 42 comprises an actuator chamber 44 which is filled with a liquid, in particular water. Increasing the liquid pressure in the actuator chamber 44 will allow the displacement of a control element 46 connected to an actuator diaphragm 48. On the side of the actuator diaphragm 48 which is opposite the actuator chamber 44 there is a second chamber 50 which is filled with air. A pressure indicating device 20 according to the invention, as described with reference to FIG. 2, is fluidically connected to the second chamber 50. The aforementioned characteristics of diaphragm 36 allow for an exchange of air with the ambient atmosphere to take place in the second chamber 50. Damage to the actuator diaphragm 48 may result in a flow of a liquid, in particular water, into the second chamber 50. However, as diaphragm 36 of the pressure indicating element is liquid-impermeable, piston 26 will be displaced and thus indicate damage to actuator diaphragm 48, as described with reference to in FIG. 2.

According to the invention, this allows a simple and reliable indication of damage to an actuator diaphragm.

LIST OF REFERENCE SIGNS 10 pressure indicating device
12 cylinder
14 piston
16 spring
18 port
20 pressure indicating device
22 cylinder
24 port
26 piston
28 spring
30 piston surface
32 opening
34 duct
36 diaphragm
40 control valve
42 diaphragm actuator
44 actuator chamber
46 valve rod
48 actuator diaphragm
50 second chamber

What is claimed is:

1. A pressure indicating device for indicating a pressure in a first fluid system, said pressure indicating device comprising: a first port via which said pressure indicating device is fluidically connected to the first fluid system comprising a first fluid and a second fluid, a cylinder in which a preloaded piston can be displaced in an axial direction, during which movement fluid contained in the first fluid system can act on the piston surface, wherein said piston has an opening in its piston surface, which opening is in fluid communication with a second fluid system via a second port, wherein said piston comprises a diaphragm that separates the first port from the second port and restricts the fluid communication between the first port and the second port via said opening because said diaphragm is impermeable to the first fluid but permeable to the second fluid.

2. The pressure indicating device as claimed in claim 1, wherein the diaphragm is impermeable to the first fluid comprising a liquid and permeable to the second fluid comprising a gas or a gas mixture.

3. The pressure indicating device as claimed in claim 2, wherein said diaphragm is permeable to air, but impermeable to water or oil.

4. The pressure indicating device as claimed in claim 2, wherein the second port is suitable for creating a connection which is in fluid communication with the environment/ambient atmosphere.

5. The pressure indicating device as claimed in claim 2, wherein the preload is generated by a coil spring acting on a piston ring surface of the piston.

6. The pressure indicating device as claimed in claim 2, wherein the piston comprises a piston rod which acts as an indicating element so that, when the preloading element is compressed, piston rod will form a section that can be seen outside the cylinder.

7. The pressure indicating device as claimed in claim 1, wherein said diaphragm is permeable to air, but impermeable to water or oil.

8. The pressure indicating device as claimed in claim 7, wherein the second port is suitable for creating a connection which is in fluid communication with the environment/ambient atmosphere.

9. The pressure indicating device as claimed in claim 7, wherein the preload is generated by a coil spring acting on a piston ring surface of the piston.

10. The pressure indicating device as claimed in claim 7, wherein the piston comprises a piston rod which acts as an indicating element so that, when the preloading element is compressed, piston rod will form a section that can be seen outside the cylinder.

11. The pressure indicating device as claimed in claim 1, wherein the second fluid system comprises the environment/ambient atmosphere.

12. The pressure indicating device as claimed in claim 11, wherein the preload is generated by a coil spring acting on a piston ring surface of the piston.

13. The pressure indicating device as claimed in claim 11, wherein the piston comprises a piston rod which acts as an indicating element so that, when the preloading element is compressed, piston rod will form a section that can be seen outside the cylinder.

14. The pressure indicating device as claimed in claim 1, wherein the preload is generated by a coil spring acting on a piston ring surface of the piston.

15. The pressure indicating device as claimed in claim 14, wherein the piston comprises a piston rod which acts as an indicating element so that, when the preloading element is compressed, piston rod will form a section that can be seen outside the cylinder.

16. The pressure indicating device as claimed in claim 1, wherein the piston comprises a piston rod which acts as an indicating element so that, when the preloading element is compressed, the piston rod will form a section that can be seen outside the cylinder.

17. The pressure indicating device as claimed in claim 16, wherein the first fluid comprises water that leaked from one side of an actuator diaphragm into an air chamber on an opposite side of the actuator diaphragm and the second fluid comprises ambient atmosphere.

* * * * *